US010487522B2

(12) United States Patent
Melic (10) Patent No.: US 10,487,522 B2
(45) Date of Patent: Nov. 26, 2019

(54) SYSTEM FOR ANCHORING A POST TO A CONCRETE SLAB OR OTHER STRUCTURE (71) Applicant: Jonathan Jonny Melic, Richmond Hill (CA)

(72) Inventor: Jonathan Jonny Melic, Richmond Hill (CA)

(*) Notice: Subject to any disclaimer, the term of this patent is extended or adjusted under 35 U.S.C. 154(b) by 0 days.

(21) Appl. No.: 16/068,707

(22) PCT Filed: Jul. 10, 2017

(86) PCT No.: PCT/CA2017/050023
§ 371 (c)(1),
(2) Date: Jul. 9, 2018

(87) PCT Pub. No.: WO2017/120666
PCT Pub. Date: Jul. 20, 2017

(65) Prior Publication Data
US 2019/0024397 A1 Jan. 24, 2019

Related U.S. Application Data (60) Provisional application No. 62/277,048, filed on Jan. 11, 2016.

(51) Int. Cl.
E04G 21/32 (2006.01)
E04H 17/22 (2006.01)
(Continued)

(52) U.S. Cl.
CPC ......... E04G 21/3242 (2013.01); E04H 17/22 (2013.01); F16B 2/065 (2013.01); F16B 5/0635 (2013.01); F16B 7/105 (2013.01)

(58) Field of Classification Search
CPC ............................ E04G 21/3242; E04H 17/22
See application file for complete search history.

(56) References Cited

U.S. PATENT DOCUMENTS

| 3,938,619 | A | 2/1976 | Kurabayashi et al. |
| 3,995,833 | A | 12/1976 | McLaughlin et al. |
| 2009/0311066 | A1 | 12/2009 | Utille |

FOREIGN PATENT DOCUMENTS

FR 1599463 A 7/1970

OTHER PUBLICATIONS

PCT/CA2017/050023, International Search Report and Written Opinion, dated Jul. 7, 2017.
(Continued)

Primary Examiner — Patrick J Maestri
(74) Attorney, Agent, or Firm — Crowe & Dunlevy, P.C.

(57) ABSTRACT

A post for anchoring to a structure. The post comprising an elongate member, a lower jaw secured to the lower end of the elongate member, and an upper jaw releasably securable to the elongate member to permit an adjustment of the distance between the jaws. The post includes a compression clamp secured to the upper jaw and releasably engagable with a surface of the structure when the post is positioned about thereabout with said upper jaw adjacent to one surface of the structure and said lower jaw adjacent to the opposite surface. The compression clamp includes a visual indicator to provide visual notice of the application of sufficient compressive force to secure the jaws on opposite sides of the structure in order to accommodate a predetermined lateral load upon the elongate member and to resist the disengagement of the post from the structure.

15 Claims, 8 Drawing Sheets (51) Int. Cl.
  *F16B 2/06* (2006.01)
  *F16B 5/06* (2006.01)
  *F16B 7/10* (2006.01)

(56) References Cited

OTHER PUBLICATIONS

EP17738054, Supplementary European Search Report; dated Jun. 14, 2019.

SYSTEM FOR ANCHORING A POST TO A CONCRETE SLAB OR OTHER STRUCTURE

FIELD

This invention relates generally to posts and edge protection for use on highrise buildings, and in one particular embodiment to a system for anchoring a support post to a concrete slab or other structure.

BACKGROUND

Most jurisdictions require safety netting and/or edge protection around the exterior of multi-storey buildings during their. Such edge protection may take any one of a wide variety of different forms depending upon the nature of the building or construction at hand, and taking into account local health and safety laws and jurisdictional requirements. Where the building is of a concrete slab construction, one particular form of edge protection involves the placement of a series of fence or barrier panels around the perimeter of the concrete slab which forms an individual floor of the building to help prevent people or objects from falling off.

Just as there are a wide variety of different forms of edge protection, there are also a wide variety of different manners in which individual fence or barrier panels can be secured to a concrete slab or other similar or such structure. One method of securing the panels in place is through the use of what in the industry is often referred to as a "slab grabber"; typically comprised of a post having an upper flange portion that contacts the upper surface of the slab and a lower flange portion that contacts the lower surface of the slab. The respective flange portions can then be compressed against the surfaces of the slab to secure the post in place, somewhat similar to the manner in which a vice can be secured around an object to be held between its jaws.

As local by-laws and jurisdictional requirements are continuously updated to require the amount of force or loading that edge protection must be capable of withstanding, there continually exists a need for enhancing the integrity of the mounting of posts to the edge of a concrete slab for holding and securing safety fences or barriers. There is also always a desire to develop more cost efficient solutions to issues faced in the construction industry.

SUMMARY

The invention therefore provides a post for anchoring to a concrete slab or a structure, the post comprising an elongate member having an upper end and a lower end; a lower jaw secured to the lower end of said elongate member; an upper jaw releasably securable to said elongate member so as to permit an adjustment of the distance between said upper and lower jaws; and a compression clamp secured to said upper jaw, said compression clamp releasably engagable with a surface of the a slab or a structure when said post is positioned about the slab or the structure with said upper jaw adjacent to one surface of the slab or the structure and said lower jaw adjacent to the opposite surface of the slab or the structure, said compression clamp including a visual indicator to provide visual notice of the application of sufficient compressive force by said compression clamp to secure said jaws on opposite sides of the slab or the structure in order to accommodate a predetermined lateral load upon said elongate member and to thereby resist the disengagement of said post from the slab or the structure.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
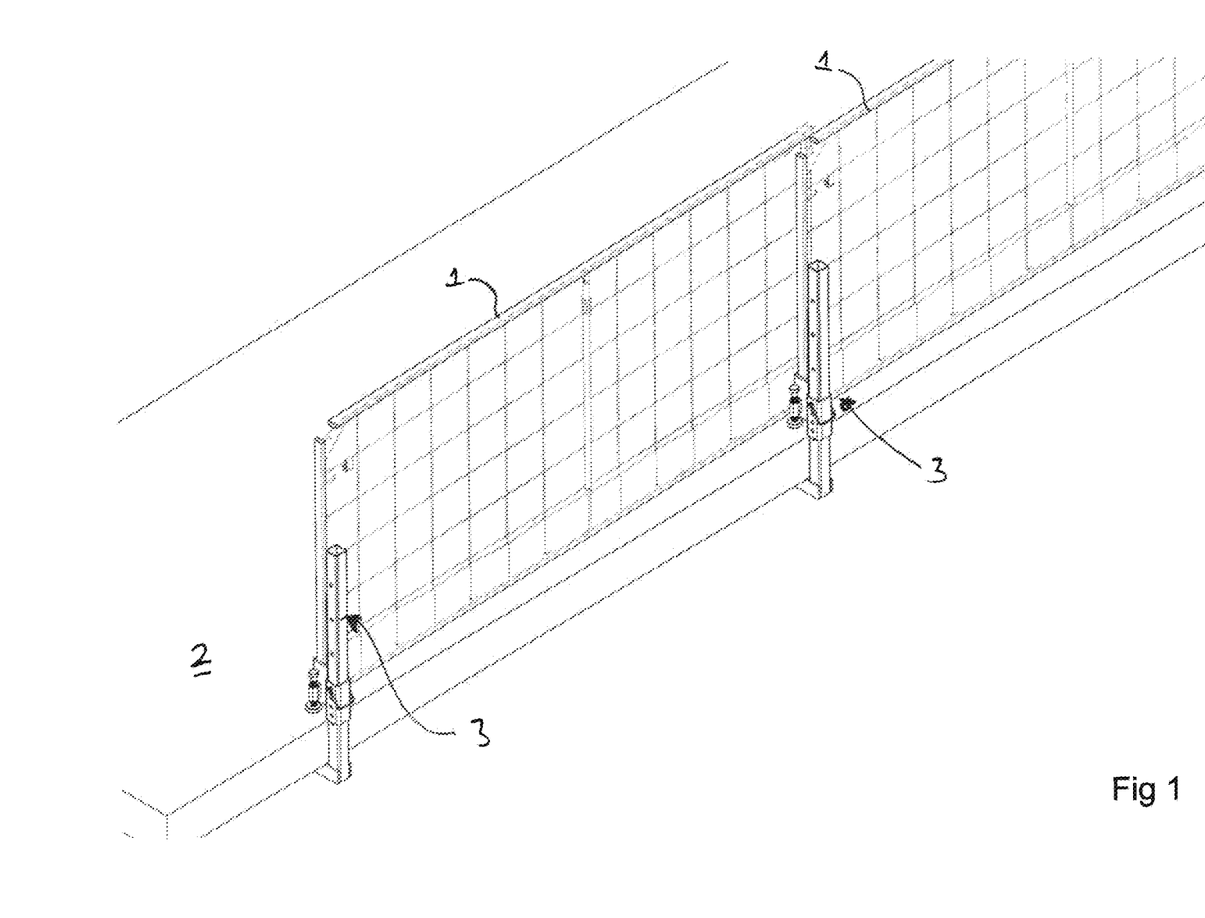
FIG. 1 is an upper side perspective view of a form of edge protection comprising fencing panels secured along the edge of a concrete slab through use of a clamping or anchoring system constructed in accordance with an embodiment of the present invention.

With reference to FIG. 1 there is shown a typical barrier fence comprised of a plurality of fence panels 1 that are mounted along the edge of a concrete slab or structure 2, forming part of a building under construction or renovation. The plurality of fence panels comprise a form of edge protection to prevent people or objects from falling off the side of the concrete slab. It will be appreciated that although in the attached figures and the description below there are numerous references to concrete slab 2 or slab 2, the described device forming the invention herein may equally be used about other structural features, including but not limited to, wooden or metallic beams, balconies, flooring systems or other constructions (generally referred to as "structures"). As shown in FIG. 1, in the exemplary embodiment fence panels 1 are held in place about the edge of a concrete slab 2 through the use of a post 3 (or a series of posts 3) constructed in accordance with an embodiment of the invention.

Figure 2:
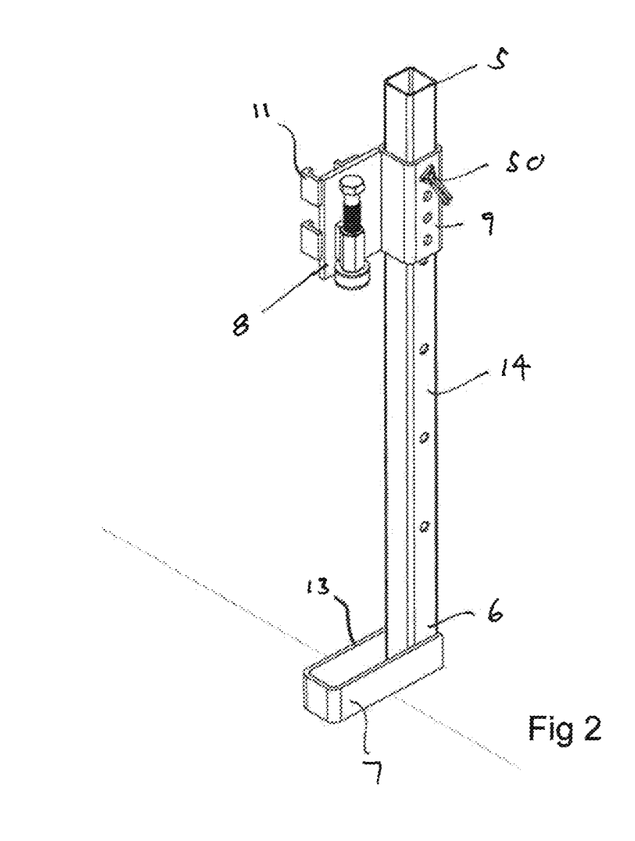
FIG. 2 is an upper perspective view of the post of FIG. 1 prior to its engagement with the concrete slab.
Figure 3:
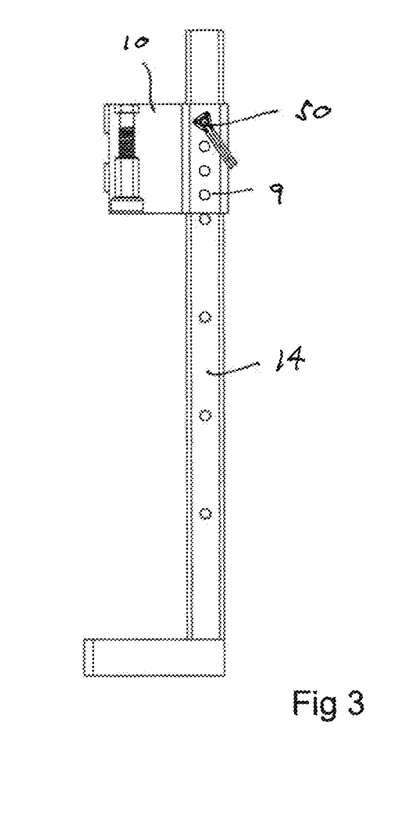
FIG. 3 is a side elevational view of the post shown in FIG. 2.
Figure 4:
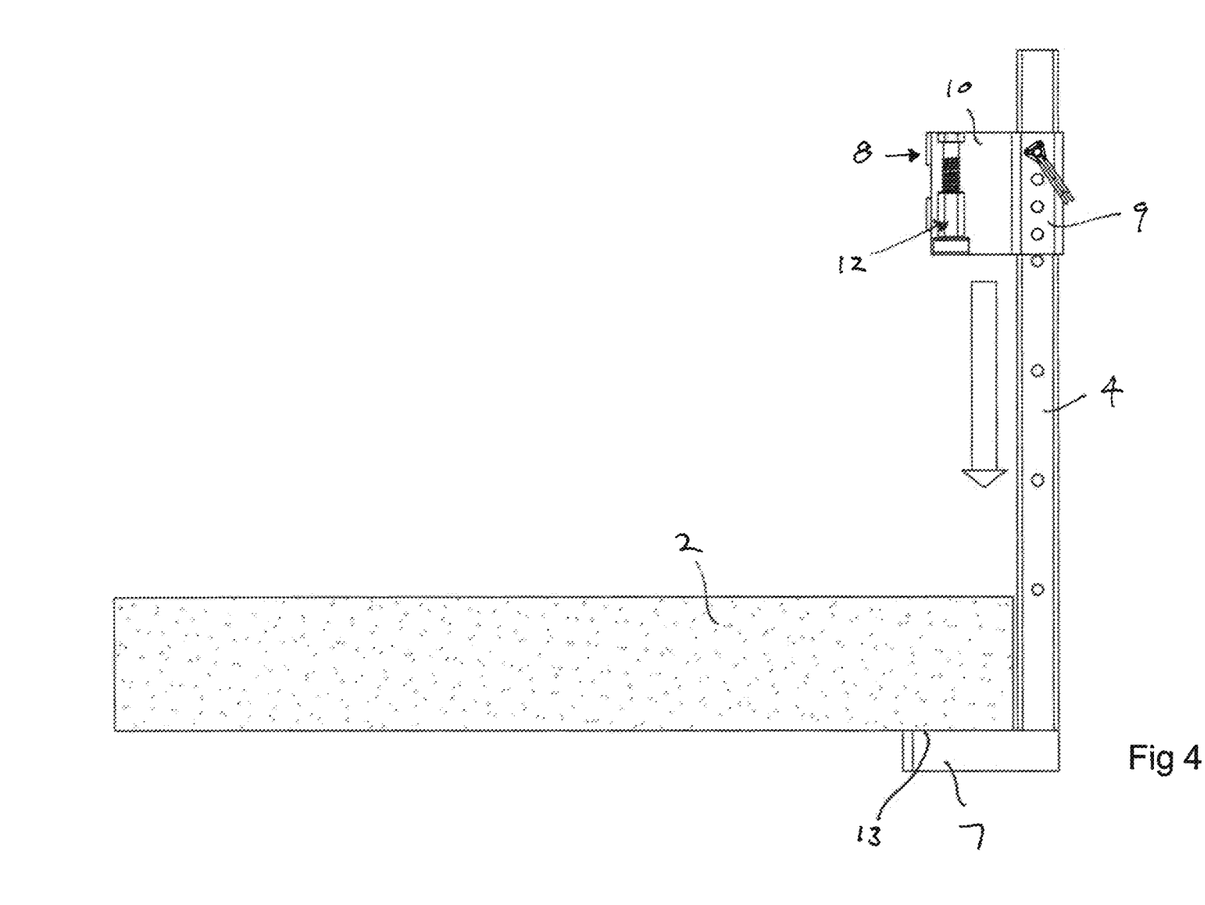
FIG. 4 is a side elevational view of the post shown in FIG. 3 as it would initially be contacted with the concrete slab, prior to being secured thereto.
Figure 5:
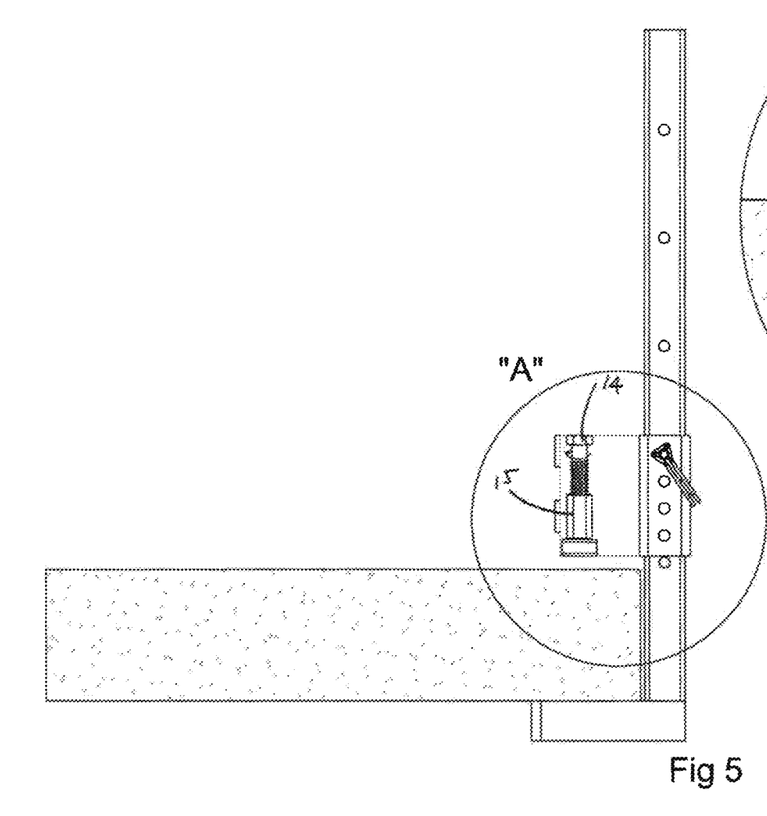
FIG. 5 is a view subsequent to FIG. 4 when the upper flange of the post has been lowered such that it is adjacent to the upper surface of the concrete slab.

As shown more specifically in FIGS. 2 and 3, post 3 is comprised generally of an elongate member 4 having an upper end 5 and a lower end 6. A lower jaw 7 is secured to elongate member 4 at or near lower end 6. Lower jaw 7 will extend outwardly from elongate member 4 at an approximate 90 degree angle and will be rigidly secured to the elongate member through welding, through the use of any one of a wide variety of mechanical fasteners, or through potentially manufacturing the lower jaw and the elongate member as a unitary component. Post 3 further includes an upper jaw 8 that is preferably releasably securable to elongate member 4 so as to permit an adjustment of the distance between the upper and lower jaws to accommodate concrete slabs of different thicknesses. Upper jaw 8 also extends outwardly from elongate member 4 at an approximate right angle.

In the particular embodiment of the invention shown in the attached drawings, upper jaw 8 includes a sleeve portion 9 that is slidably receivable about the exterior surface of elongate member 4 to allow for an adjustment of the position of the upper jaw relative to the lower jaw. Sleeve 9 is thus releasably securable along the length of elongate member 4. In the particular embodiment depicted, both the sleeve and the elongate member are fitted with holes that align when the sleeve is positioned at discreet locations along the length of the elongate member. When the holes are aligned, a fastener (in most instances a pin or bolt) 50 can be inserted through the holes in order to secure the sleeve to the elongate member and prevent further longitudinal movement.

Upper jaw 8 further includes an extension arm 10 that extends outwardly from sleeve 9, at an approximate right angle to both sleeve 9 and elongate member 4. In one of the preferred embodiments of the invention extension arm 10 includes a fence panel clamp 11 that releasably secures fence panel 1 to upper jaw 8. As will become apparent from a complete understanding of the invention, when post 3 is engaged about concrete slab or structure 2, securing fence panel 1 to fence panel clamp 11 will result in the fence panel being held securely and in a generally vertical orientation about the edge of concrete slab 2. In an alternate embodiment, other mechanisms to secure fence panel 1 to post 3 (including simply using a flexible wire wrapped around the post and the fence panel) could be utilized.

With reference to FIGS. 4 through 12, the manner in which post 3 may be secured about the edge of concrete slab 2, and the particular structure of the post as shown in the depicted embodiment, will be described in further detail. The engagement of post 3 with concrete slab 2 first involves placing the post adjacent to the edge of the concrete slab such that lower jaw 7 is below the slab, upper jaw 8 is above the slab and elongate member 4 positioned generally along the side vertical edge of the slab (see FIG. 4). Sleeve 9 will then be slid along the length of elongate member 4 until it is in close proximity to the upper surface of slab 2 (see FIG. 5) at which time fastener 50 may be inserted to secure the sleeve to the elongate member and to retain the upper jaw in close proximity to the upper surface of slab 2. Thereafter, the mounting of post 3 to the concrete slab is achieved through the utilization of a compression clamp 12 that is secured to upper jaw 8, and in the depicted embodiment secured specifically to extension arm 10. With lower jaw 7 engaging the lower surface of concrete slab 2 and upper jaw 8 fixedly secured to elongate member 4 in close proximity to the upper surface of concrete slab 2, activation of compression clamp 12 will cause the respective upper and lower jaws to be compressed or "clamped" about the upper and lower surfaces of the concrete slab, thereby securely retaining elongate member 4 in a generally vertical orientation along the edge of the slab. If desired, the upper surface 13 of lower jaw may be a friction enhancing surface or may have friction enhancing characteristics (e.g. a roughened surface, a series of pointed elements, a series of ridges or ribs, the application of a friction enhancing coating, etc.) in order to help prevent any slippage between upper surface 13 and the lower surface of the concrete slab.

In the particular embodiment of the invention shown in the attached drawings, compression clamp 12 generally comprises a threaded bolt 14 that is received within a correspondingly threaded nut 15, wherein nut 15 is rigidly attached to extension arm 10. In this manner, threading bolt 14 into nut 15 causes the lower end 16 of the bolt to move toward the upper surface of concrete slab 2 and eventually into contact with the concrete. As the bolt continues to be rotated, the compressive force applied to the concrete increases, as does the "clamping" of the upper and lower jaws about the concrete slab. To enhance the engagement of the lower surface or lower end 16 of bolt 14 with the concrete slab, the lower end of the bolt may be pointed or fitted with a separate toothed, pointed or sharpened element or feature 17 that physically impinges into the surface of the concrete when the bolt is tightened, thereby minimizing the tendency for upper jaw 8 to be disengaged with the concrete should a horizontal load be applied to elongate member 4 (such as a load that would result should an individual or object contact fence panel 1 when the fence panel is secured to post 3).

In accordance with the invention, compression clamp 12 further includes a visual indicator (generally noted by reference 18) that provides a visual notice or signal to an operator that there has been a sufficient application of compressive force between the upper and lower jaws to secure the jaws in place on opposite sides of concrete slab 2 so as to rigidly hold post 3 in position. It will be appreciated that depending upon the particular jurisdictional requirements, the particular size of fence panels 1, the anticipated horizontal loading to which the fence panels (and hence the posts) could be subjected, and various other factors, the amount of compressive force applied by the upper and lower jaws to the concrete slab to sufficiently hold elongate member 4 in a vertical orientation can vary from application to application. For that reason, and as will be appreciated from an understanding of the invention, visual indicator 18 can be designed specifically for particular operating conditions or particular jurisdictional requirements to signify to an operator that a sufficient compressive force has been applied. In this instance the visual indicator will signify that bolt 14 has been sufficiently torqued.

Figure 6:
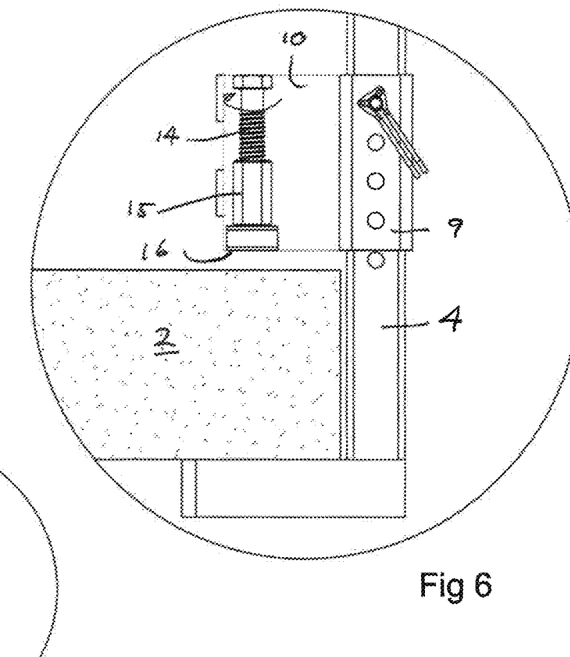
FIG. 6 is an enlarged detailed view of portion "A" of FIG. 5.
Figure 7:
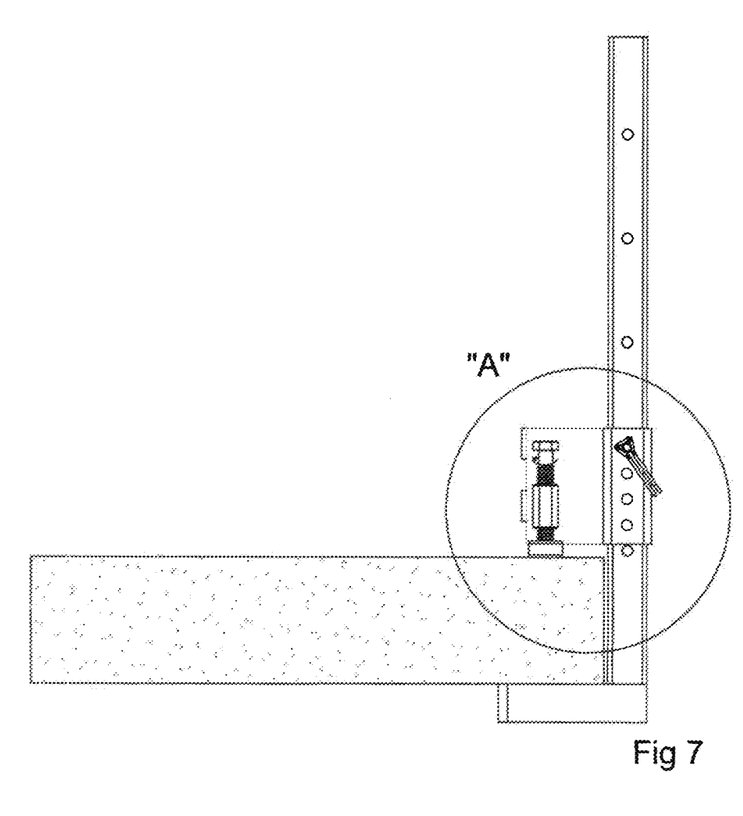
FIG. 7 is a view subsequent to FIG. 5 wherein the upper flange has been engaged with the upper surface of the concrete slab.
Figure 8:
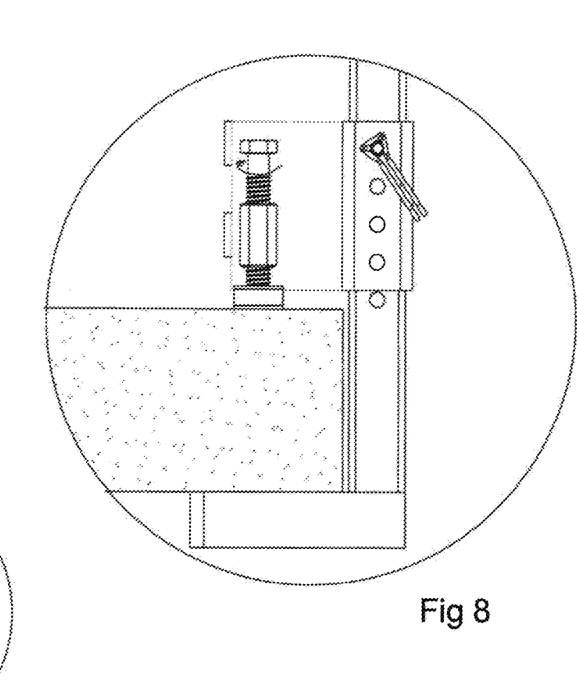
FIG. 8 is an enlarged detailed view of portion "A" shown in FIG. 7.
Figure 9:
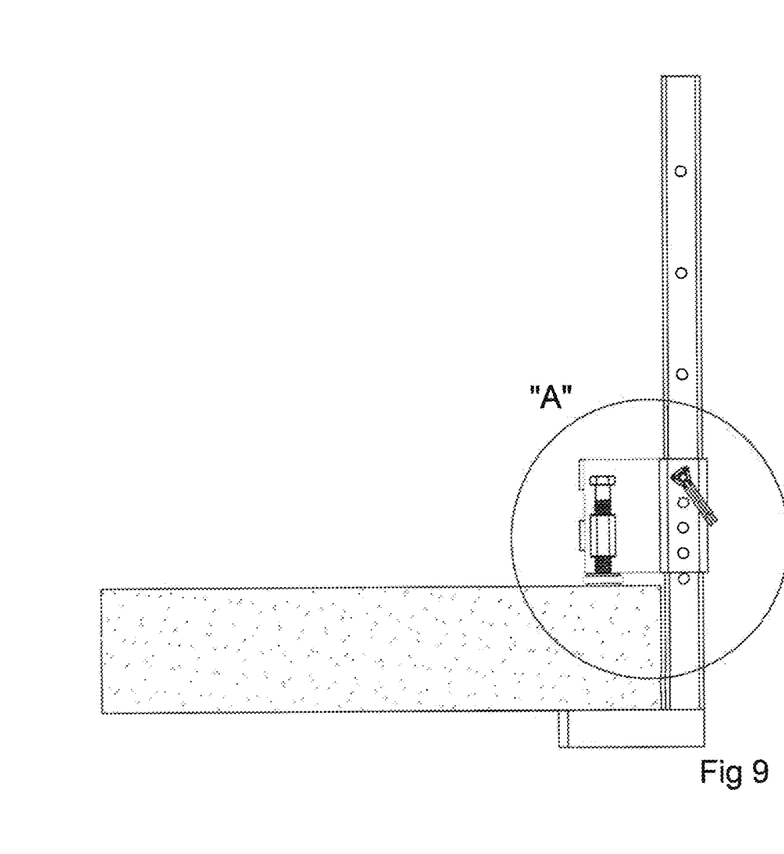
FIG. 9 is a view subsequent to that shown in FIG. 8 wherein the upper flange has been fully engaged and has been compressed against the upper surface of the concrete slab, locking the post in position.
Figure 10:
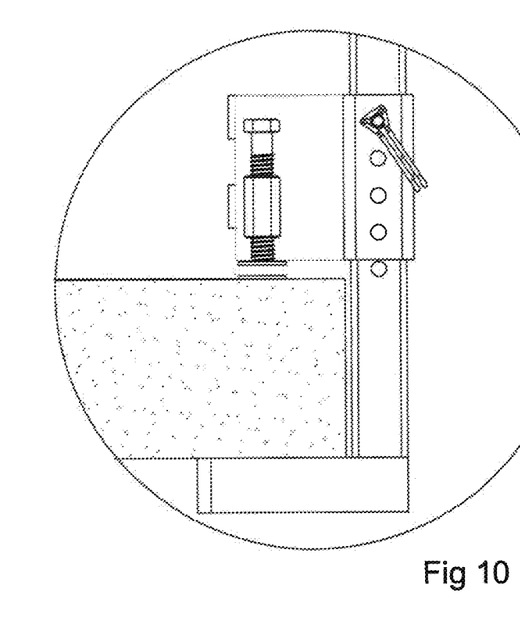
FIG. 10 is an enlarged detailed view of portion "A" of FIG. 9.
Figures 11, 12:
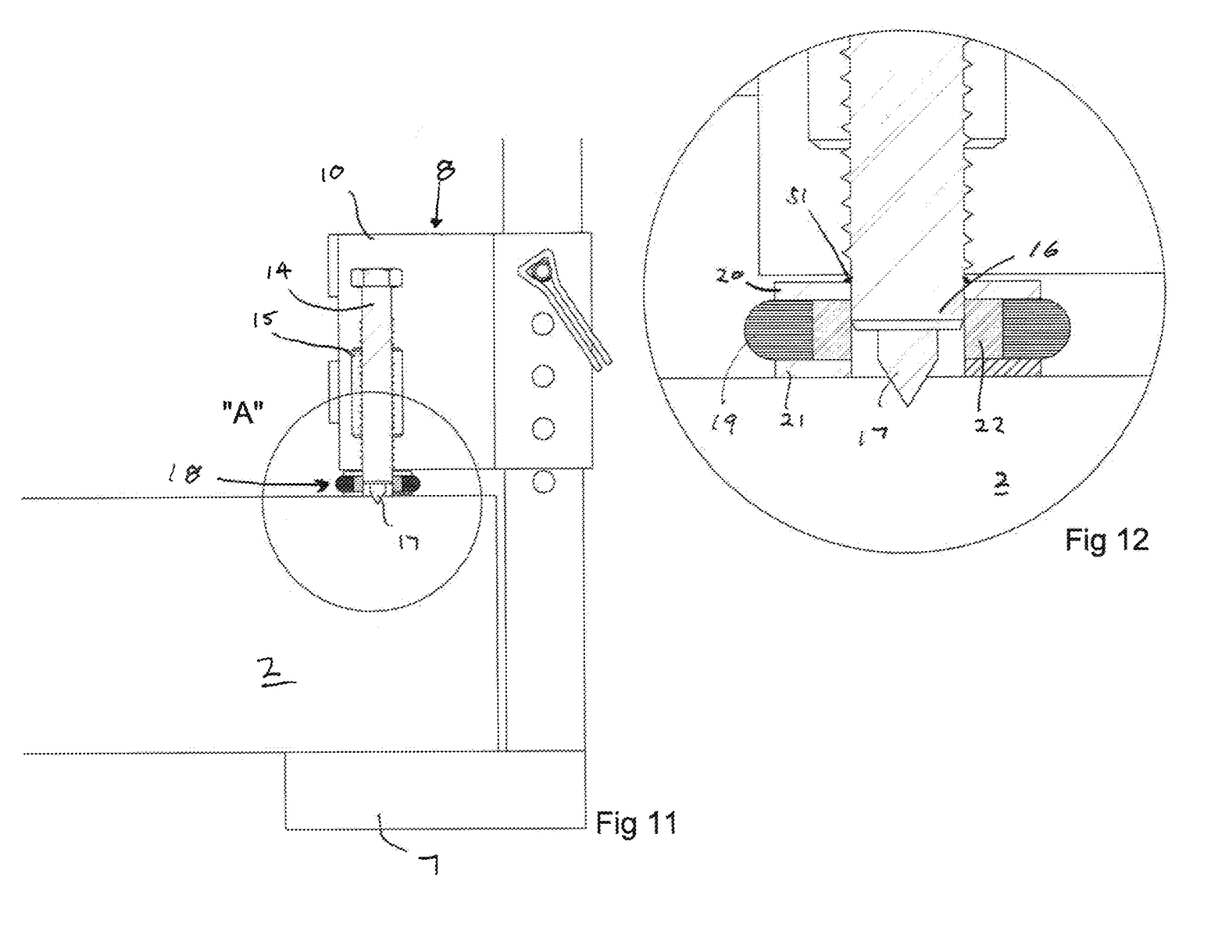
FIG. 11 is a vertical sectional view through the locking structure of the upper flange of FIG. 9 detailing its securement to the upper surface of the concrete slab.
FIG. 12 is an enlarged detailed view of portion "A" of FIG. 11.

With particular reference to FIGS. 11 and 12, in the embodiment of the invention shown, visual indicator 18 includes a compressible material 19 that is generally in the form of a torroid encompassing lower end 16 of bolt 14. In accordance with the invention, when compression clamp 12 is not applying a compressive force against the upper surface of concrete slab 2 (i.e. when it is disengaged) compressible material 19 is normally obscured from the view of an operator. In the depicted embodiment the obscurement of compressible material 19 will generally be in a vertical direction, such that when looking downwardly upon upper jaw 8 and bolt 14, compressible material 19 will be generally obscured from view (as shown in FIG. 6). However, when compression clamp 12 is activated (or in an engaged position) and applies a compressive force against the upper surface of the concrete slab, compressible material 19 is compressed such that as the compressive force increases material 19 will no longer be obscured from view, The visibility of compressive material 19 signifies to an operator that the compression clamp has been activated and is applying a sufficient compressive force against the upper surface of the concrete slab to secure post 3 in position. Compressible material 19 will thus be designed such that it will compress and become visibly noticeable to the operator only upon the application of a pre-determined degree of compression, wherein that pre-determined degree of compression is sufficient to secure post end 3 to the extent necessary to satisfy jurisdictional and safety requirements. It is anticipated that in most instances compressible material 19 will be resilient and will be formed from a rubber, nitrile rubber, polyethylene, silicone based or other elastomeric and flexibly resilient material.

With reference again to FIGS. 11 and 12, there is depicted one embodiment of the construction of visual indicator 18 pursuant to the current invention. In this embodiment the visual indicator further includes an upper washer 20 and a lower washer 21. Each of washers 20 and 21 are received about lower end 16 of bolt 14 with the lower end of the bolt generally received through the central portion of each washer. Compressible material 19 is effectively sandwiched between the upper and lower washers. A spacer or stopper 22 is also positioned generally concentrically about lower end 16 of bolt 14 and between the upper and lower washers. Upper washer 20 may be rigidly secured or fixed to the exterior surface of lower end 16 of bolt 14 such that rotation of the bolt causes a rotation of upper washer 20 and movement of the washer in a direction toward or away from extension arm 10. In the attached drawings (see in particular FIG. 12), upper washer 20 is secured to bolt 14 though a weld 51. In an alternate embodiment (not shown) upper washer 20 may be received within a circumferential groove about the exterior of lower surface 16 of bolt 14, or may abut against an upper radial flange extending outwardly from the surface of the bolt such that rotation of the bolt in a downward direction causes washer 20 to be driven downwardly or away from extension arm 10, while permitting the bolt to rotate independently of upper washer 20. In either case, it will be understood that rotation of bolt 14 such that it is driven downwardly toward the upper surface of the concrete will cause washer 20 to also be driven downwardly towards the concrete, thereby applying a compressive force to compressible material 19.

One of the primary functions of lower washer 21 is to provide a bearing surface for compressible material 19 in order to help prevent damage or destruction of compressible material 19 should there be movement between the compressible material and the upper surface of the concrete slab. In an alternate embodiment, the lower portion or lower surface of compressible material 19 may be coated with a friction reducing substance to help minimize damage or destruction to the compressible material in the event of movement between it and the upper surface of the concrete.

Figure 13:
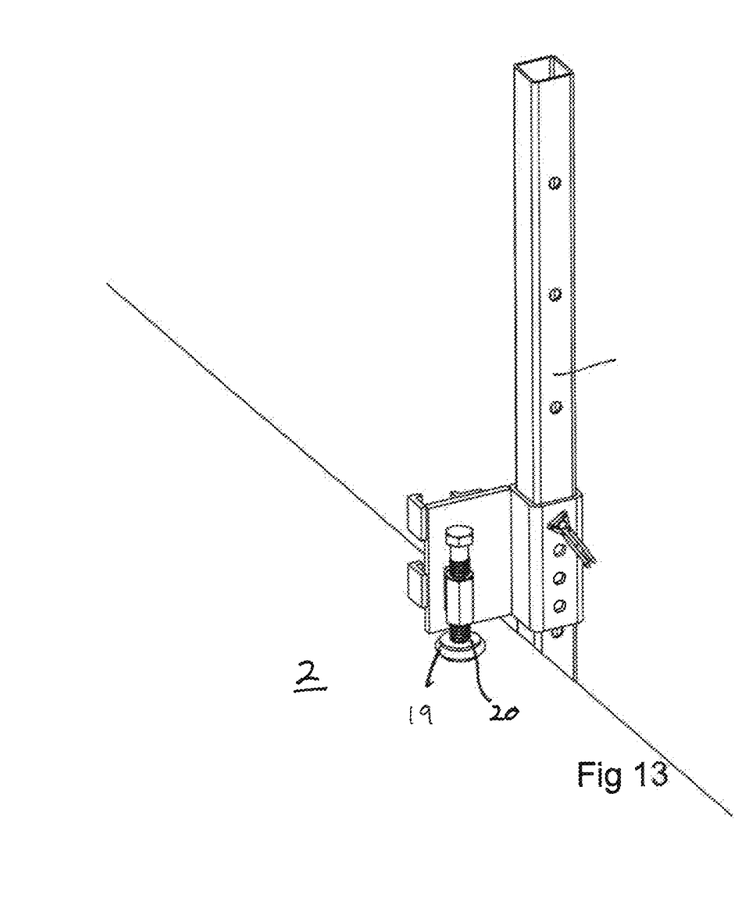
FIG. 13 is an upper perspective view of the post of FIG. 2 shown engaged with the concrete slab.
Figure 14:
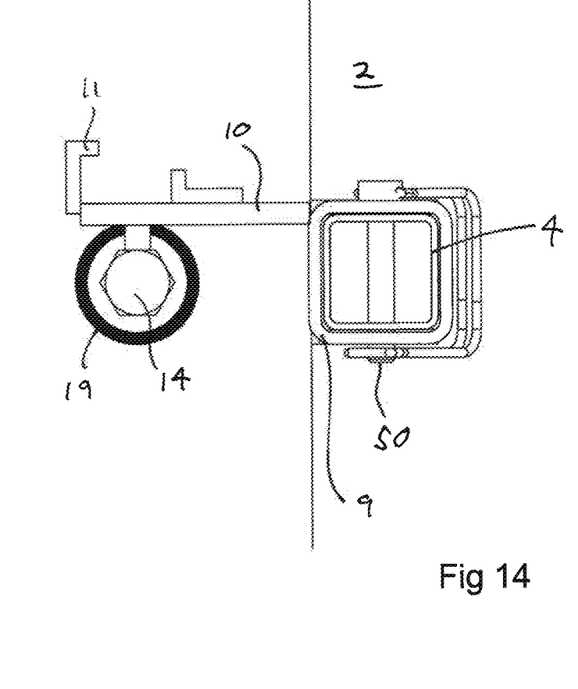
FIG. 14 is a plan view of the post shown in FIG. 13.

It will thus be appreciated that when bolt 14 is initially rotated its lower end 16 (or sharpened feature 17) will initially contact the upper surface of concrete slab 2. At the point of first contact there will effectively be no or an insufficient compressive force applied to compressible material 19 to cause it to be moved from its obscured position. Compression clamp 12 will essentially be in a position similar to that shown in FIG. 8. As bolt 14 is rotated with lower end 16 moving closer to the upper surface of concrete slab 2, sharpen feature 17 will begin to impinge upon the upper surface of the concrete slab. Lower washer 21 will contact the upper surface of the slab and upper washer 20 will be driven downwardly toward the concrete to begin the application of a compressive force to compressible material 19. As rotation of bolt 14 continues, upper washer 20 will apply an increasing compressive force to compressible material 19 until such time as the compressive material is squeezed or "squashed" radially outward from between upper washer 20 and lower washer 21 and is no longer obscured (see FIGS. 13 and 14). At that point the compressible material will be readily visible to an operator standing generally above upper jaw 8, signifying that enough force has been applied to secure post 3 in place.

The dimensions and construction of compressible material 19 can be chosen such that it becomes visible to the operator only upon the application of a compressive force sufficient to hold the upper and lower jaws about the exterior surface of the concrete slab to a degree in accordance with local jurisdictional and construction related requirements. In that regard, when designing and manufacturing compressible material 19, factors such as the type of material, radial dimension, vertical height, the size of upper washer 20, etc. may be taken in account.

With reference to FIGS. 11 and 12, it will be noted that eventually rotation of bolt 14 will cause spacer 22 to become wedged between upper washer 20 and lower washer 21, with the lower washer seated against the upper surface of concrete slab 2. At this point spacer 22 will effectively prevent further movement of the bolt in a downward direction, thereby limiting the degree to which sharpened feature 17 can impinge upon the upper surface of the concrete. Spacer 22 can thus be designed to limit the degree of chipping or "damage" that sharpened feature 17 can cause to the concrete. As will be apparent from an understanding of the invention, the height of spacer 22 will be chosen so as to permit a compression of material 19, while at the same time limiting the degree of travel of feature 17 into the surface of the concrete. It should also be appreciated that in an alternate embodiment, the lower surface of spacer 22 may directly contact the surface of the slab or structure 2.

In some instances it is undesirable to leave holes or chips in the upper surface of the concrete slab (for example on balconies). In such cases, it may be desirable to refrain from the use of sharpened feature 17, or to incorporate a foot or shoe member (not shown) over sharpened feature 17. Where a foot or shoe is utilized, its lower surface will engage the upper surface of the concrete without penetrating it or otherwise causing significant damage. In such instances, it may be desirable for the lower surface of the foot to have friction enhancing features or a friction enhancing coating to help prevent slippage between the foot and the upper surface of the concrete.

When it is desired to remove post 3 from the edge of the concrete slab or structure 2, bolt 14 merely needs to be rotated in an opposite direction to cause lower end 16 to retreat from the upper surface of the concrete slab or structure. As the bolt is rotated compression clamp 12 will become deactivated, permitting the upper and lower jaws to be retracted from around the concrete slab. Where material 19 is resilient, its resiliency will allow post 3 to be reused in a different location with the compressible material once again providing a visual indictor as to when a sufficient compressive force has been applied by clamp 12 to securely hold the post in place.

It will be appreciated that the described invention will allow a simple, fast and easy inspection of the integrity of the clamping of post 3 about a concrete slab or other structure through merely walking along the edge of the slab or structure and visually looking downwardly upon upper jaw 8 to determine whether compressible material 19 is readily visible. If the compressible material is readily visible the operator will know that a sufficient compressive force is being applied by clamp 12 to securely hold post 3 in place. If the compressible material is not readily visible the operator will know that the post may be unsafe and that bolt 14 should be further torqued. To further aid in the ability of visual indicator 18 to signify that a sufficient compressive force has been applied to securely hold post 3 in position, compressible material 19 may be painted or dyed a particular colour to signify that the post is "safe". For example, compressible material 19 may be green in colour such that if an operator visually sees the green compressible material when looking downwardly upon upper jaw 8 the operator will know that post 3 is safely being held in place.

Further, the compression of material 19 when compression clamp 12 is engaged will help to account for minor shrinkage of the concrete slab as it cures. That is, in the case of a standard mechanical clamp, shrinkage of the concrete will have the tendency to reduce the effective clamping force applied and holding post 3 in position. Where compressible material 19 is utilized, minor shrinkage of the concrete will have a lesser impact on the integrity of the clamping force of the post about the concrete. In addition, compressible material 19 will have a tendency to at least partially absorb vibrational forces that may be carried by the concrete slab or structure 2 to post 3. If not accounted for and dealt with appropriately, such vibrational forces can result in the loosening of the clamp about the exterior of the slab or structure.

It is to be understood that what has been described are the preferred embodiments of the invention. The scope of the claims should not be limited by the preferred embodiments set forth above, but should be given the broadest interpretation consistent with the description as a whole.

I claim:

1. A post for anchoring to a concrete slab or a structure, the post comprising:
    an elongate member having an upper end and a lower end;
    a lower jaw secured to the lower end of said elongate member;
    an upper jaw releasably securable to said elongate member so as to permit an adjustment of the distance between said upper and lower jaws; and
    a compression clamp secured to said upper jaw, said compression clamp releasably engageable with a surface of a slab or a structure when said post is positioned about the slab or the structure with said upper jaw adjacent to one surface of the slab or the structure and said lower jaw adjacent to the opposite surface of the slab or the structure, said compression clamp including:
        a bolt engaged with said upper jaw, said bolt having an upper end and a lower end, said lower end including at least one sharpened or pointed element that impinges the slab or the structure upon rotation of said bolt in a first direction; and
        a visual indicator to provide visual notice of the application of sufficient compressive force by said compression clamp to secure said jaws on opposite sides of the slab or the structure in order to accommodate a predetermined lateral load upon said elongate member and to thereby resist the disengagement of said post from the slab or the structure.

2. The post as claimed in claim 1 wherein said visual indicator includes a compressible material, said compression clamp having an engaged position and a disengaged position, when in said engaged position said compression clamp applying a predetermined degree of compressive force to a surface of the slab or the structure and said compressible material is generally visible providing an operator with a visual indication of the engagement of said compression clamp, when said compression clamp in said disengaged position said compressible material generally obscured from the view of an operator.

3. The post as claimed in claim 2 wherein said compressible material is resilient.

4. The post as claimed in claim 2 wherein said compressible material is an elastomer.

5. The post as claimed in claim 4 wherein said compressible material is a nitrile rubber, polyethylene or silicone based material.

6. The post as claimed in claim 2 wherein said bolt is threadably engaged with said upper jaw, said lower end engageable with a surface of the slab or the structure such that when said upper jaw is secured to said elongate member with said lower end of said bolt in contact with a surface of the slab or the structure and said lower jaw in contact with an opposite surface of the slab or the structure, rotation of said bolt in said first direction causes a compressive force to be applied to the surface of the slab or the structure.

7. The post as claimed in claim 6 wherein rotation of said bolt in said first direction causes a compression of said compressible material, resulting in said compressible material becoming visible to an operator upon the application of a pre-determined amount of compressive force.

8. The post as claimed in claim 6 wherein said compressible material is generally in the form of a torus that is received about the lower end of said bolt.

9. The post as claimed in claim 8 wherein said compression clamp includes an upper washer received about the lower end of said bolt, said upper washer engaging an upper surface of said compressible material such that rotation of said bolt in said first direction causes said washer to apply a compressive force to said compressible material.

10. The post as claimed in claim 9 wherein said compression clamp includes a lower washer received about the lower end of said bolt, said compressible material received between said upper and said lower washers.

11. The post as claimed in claim 1 wherein said compression clamp includes a spacer to limit the degree of impingement of said sharpened feature into the surface of the slab or the structure.

12. The post as claimed in claim 1 wherein said lower jaw includes a friction enhancing surface to engage with a surface of the slab or the structure.

13. The post as claimed in claim 1 wherein said upper jaw includes a sleeve slidably receivable about said elongate member such that a fastener may be used to secure said sleeve about said elongate member at a desired location and at a desired set-off from said lower jaw.

14. The post as claimed in claim 1 wherein said upper jaw includes a barrier or fence panel clamp to releasably secure a barrier or fence panel thereto.

15. The post as claimed in claim 2 wherein said compressible material assists in absorbing vibration transferred from the slab or structure to said post.

* * * * *